Sept. 4, 1956 W. J. CONGDON ET AL 2,761,761
METHOD FOR CONCENTRATING DILUTE NITRIC ACID
Original Filed March 20, 1951
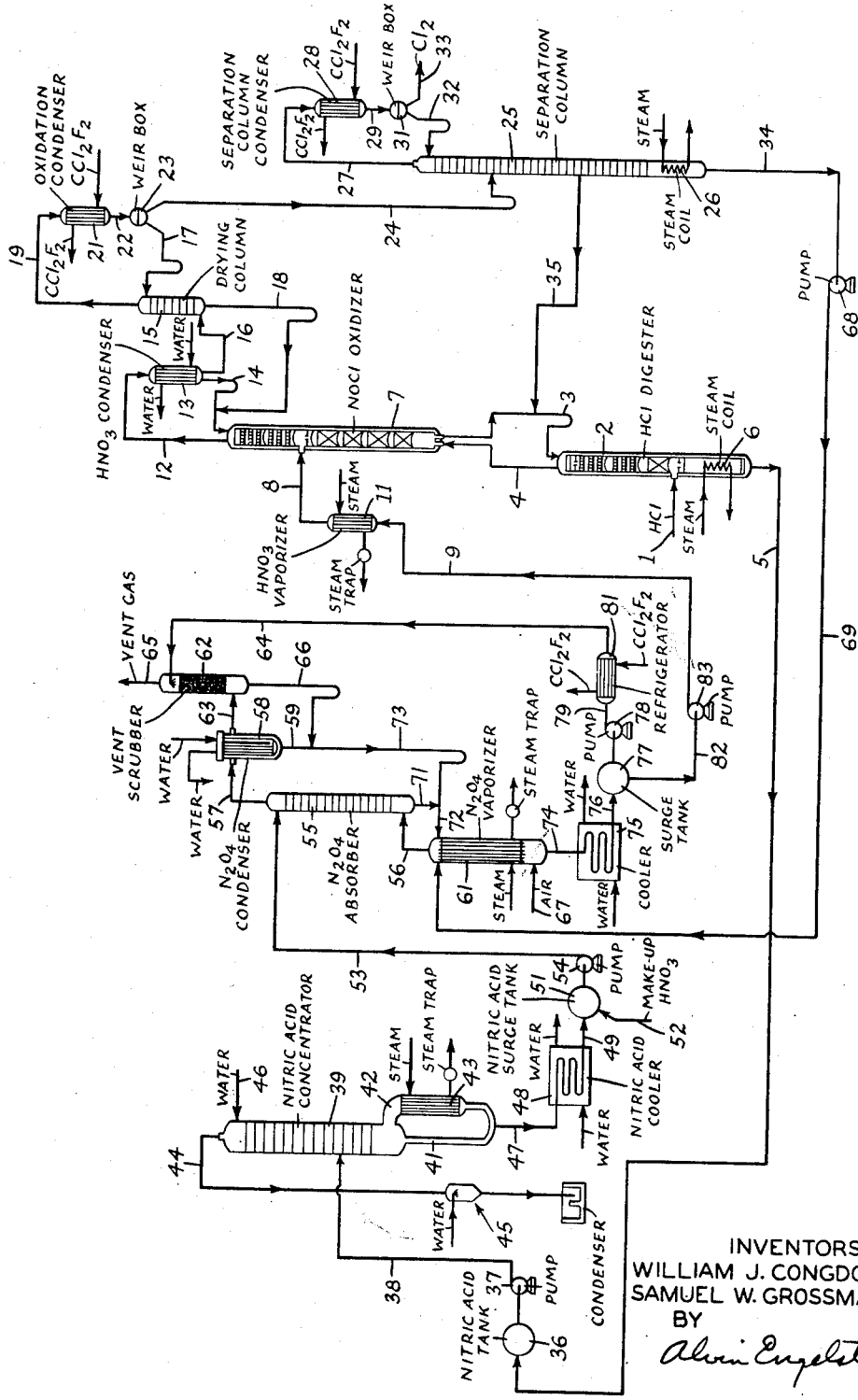
INVENTORS.
WILLIAM J. CONGDON
SAMUEL W. GROSSMANN
BY
*Alvin Engelstein*
ATTORNEY.

United States Patent Office 2,761,761
Patented Sept. 4, 1956

2,761,761

METHOD FOR CONCENTRATING DILUTE NITRIC ACID

William J. Congdon, Hopewell, and Samuel W. Grossmann, Petersburg, Va., assignors to Allied Chemical & Dye Corporation, New York, N. Y., a corporation of New York Original application March 20, 1951, Serial No. 216,592, now Patent No. 2,665,195, dated January 5, 1954. Divided and this application October 19, 1953, Serial No. 386,770

1 Claim. (Cl. 23—160)

This invention relates generally to the production of chlorine from HCl involving the use of concentrated nitric acid with the formation of dilute nitric acid. This application is a division of my copending application Serial No. 216,592 filed March 20, 1951, now Patent No. 2,665,195, and refers more particularly to a new and improved process for concentrating dilute nitric acid.

In many chemical plants chlorine is reacted with various organic compounds to produce desired chlorinated compound together with substantial quantities of unwanted by-product hydrochloric acid. This by-product hydrochloric acid in some instances is largely wasted, and not only represents a loss of resources but also presents a waste disposal problem. In addition, because of chlorine shortage additional chlorine required by the chemical manufactures is not always available. Practically all of the chlorine commercially manufactured today involves large scale production with large capital investment and further produces from the process other products such as caustic or nitrate salts. Some chemical manufacturers do not have the means or the desire to enter into large scale chlorine manufacture and do not wish to be troubled with the sale or other disposition of caustic or nitrate products accompanying such manufacture.

One object of the present invention is to provide an efficient continuous process for converting HCl into chlorine.

Another object of this invention is to provide a process for producing as the sole product of the process high yields of substantially pure chlorine.

A further object of this invention is to provide an economical process for producing chlorine from HCl with the consumption of only minor amounts of nitric acid.

Further objects and advantages will be apparent from the following description and accompanying drawing.

A preferred method of carrying out that portion of our process for effecting conversion of HCl into chlorine involves a two-stage cyclic operation wherein HCl is reacted in a first zone with effluent nitric acid from a second zone to produce as primary reaction products gaseous chlorine and nitrosyl chloride and a more dilute nitric acid, discharging the more dilute nitric acid from the first zone, passing the gaseous chlorine and nitrosyl chloride into a second zone, introducing nitric acid of at least 75 weight percent concentration into the second zone to react with the nitrosyl chloride to produce additional chlorine, nitrogen dioxide and water, discharging the mixture of gaseous nitrogen dioxide and chlorine from the second zone, and returning nitric acid diluted by the water of reaction as nitric acid effluent from the second zone to the first zone.

The $NO_2$—$Cl_2$ mixture from the second zone is separated into chlorine which is discharged from the system as the product of the process, and the separated $N_2O_4$ reacted with the dilute nitric acid withdrawn from the first zone to produce therefrom a concentrated nitric acid containing at least 75% by weight $HNO_3$, and the thus concentrated nitric acid recycled to the second zone for conversion of the nitrosyl chloride into chlorine and nitrogen dioxide.

Our preferred method of reacting $N_2O_4$ with dilute nitric acid to produce therefrom nitric acid having a concentration of at least 75% by weight $HNO_3$ involves passing $N_2O_4$ together with nitric acid cocurrently downwardly through a heated chamber countercurrent to an upward stream of air, withdrawing concentrated nitric acid of at least 75% by weight $HNO_3$ from the bottom of the chamber, passing the mixture of air and $N_2O_4$ released from the top of the chamber upwardly through an absorber countercurrent to a downward flow of dilute nitric acid, returning concentrated nitric acid from the bottom of the absorber to the top of the chamber for cocurrent downward flow with $N_2O_4$ countercurrent to the rising stream of air therein, passing the uncondensed gases from the absorber comprising a mixture of nitrogen, $N_2O_4$ and unreacted oxygen through a cooler to effect condensation of the $N_2O_4$, returning the condensed $N_2O_4$ to the chamber for cocurrent flow with nitric acid downwardly countercurrent to the stream of air, passing the residual gases comprising primarily nitrogen, unreacted oxygen and a minor amount of $N_2O_4$ leaving the cooler through a scrubber countercurrent to a portion of cold concentrated nitric acid withdrawn from the bottom of the chamber thereby removing $N_2O_4$ from the residual gases, returning the concentrated nitric acid after passage through the scrubber to the chamber for cocurrent flow with $N_2O_4$ countercurrent to the stream of air and discharging the nitrogen, oxygen gases substantially free from $N_2O_4$ from the scrubber into the atmosphere.

The accompanying drawing is a diagrammatic flow sheet illustrating the process of the present invention.

Referring to the drawing, hydrogen chloride charging stock generally admixed with water, as for example 90% HCl—10% water, is introduced in the form of a gas or liquid through line 1 into HCl digester 2 at a point below the center of the digester. Due to the corrosive nature of hydrochloric and nitric acids undergoing reaction, digester 2 is a stoneware and acid-proof cement vessel containing sections of ring packing in the base and sections of troughs in the top, all of an acid-resistant type. Nitric acid of 60–70 weight percent concentration, preferably 65–68%, enters the top of digester 2 through line 3 and flows down countercurrent to ascending HCl, $H_2O$ and reaction products. The vapors leaving the top of digester 2 through line 4 are a mixture of $Cl_2$ plus NOCl with some $HNO_3$ and $H_2O$. Liquid discharged from the base of digester 2 through line 5 is nitric acid more dilute than the nitric acid introduced into the top of digester 2 through line 3, generally about 45–55% $HNO_3$. A steam coil 6 in the base of digester 2 provides sufficient heat to accelerate the reaction between HCl and $HNO_3$, roughly a temperature of about 100° C. at the top to about 120° C. at the base of digester 2 will be adequate for this purpose. High superatmospheric pressures on digester 2 are unnecessary; low superatmospheric pressure of the order of 3 p. s. i. gauge were found satisfactory. Chloride concentration in the nitric acid discharged through line 5 should be low in order not to introduce a corrosion problem in the nitric acid concentration equipment. Steam coil 6 serves the additional function of stripping the exit nitric acid to reduce the chloride concentration to a point where corrosion of stainless steel is not excessive.

NOCl oxidizer 7 is a stoneware, acid-proof cement vessel containing packing similar to HCl digester 2. Nitric acid of 75–85% concentration, or higher enters the oxidizer 7 through line 8 above the ring-packed sections. The nitric acid prior to entrance into oxidizer 7 is desirably slightly preheated to form a mixture of liquid and vapor by passing the nitric acid through line 9 into HNO₃ vaporizer 11 wherein it passes in indirect heat exchange with steam and thence discharges through line 8 into oxidizer 7 thereby eliminating the necessity for a heater in oxidizer 7, the necessary control being obtained by the amount of acid vaporized in HNO₃ vaporizer 11. The NOCl vapor from line 4 passes upwardly through oxidizer 7 in intimate contact with the downwardly flowing concentrated nitric acid to effect a reaction therebetween to produce $Cl_2$ and $N_2O_4$, the reaction being nearly complete by the time the vapor reaches the HNO₃ feed point, i. e. the entrance of line 8 into vessel 7. The trough-packed section in oxidizer 7 above feed line 8 functions as a nitric acid concentrating section and serves to eliminate water from the vapor leaving the oxidizer through line 12. The liquid on the top plate of oxidizer 7 will be essentially 100% HNO₃ with some dissolved $N_2O_4$ and $Cl_2$. The vapor released from the top of chamber 7 through line 12 is a mixture of $NO_2$, $N_2O_4$, and nitric acid (100%). The conditions maintained in NOCl oxidizer 7 are milder than those in HCl digester 2, the former having a top temperature of about 65–70° C., a bottom temperature of approximately 100° C. and a pressure of a few pounds gauge.

Vapors from line 12 are cooled to about 40° C. by indirect heat exchange with water in HNO₃ condenser 13 to condense out as much HNO₃ as possible and to reduce the load on the refrigeration system. Nitric acid condensate from condenser 13 is returned through line 14 and flows down NOCl oxidizer 7 as reflux. Uncondensed vapor from condenser 13 enters drying column 15 through line 16 where the last traces of HNO₃ are removed by scrubbing the vapor with liquid $N_2O_4$—$Cl_2$ introduced into the top of column 15 through line 17. The drying column 15 is a ceramic and acid-proof cement tower containing a plurality of baffle plates to insure intimate contact between the vapors and downflowing liquid. The liquid accumulating in the bottom of drying tower 15 composed of HNO₃, $N_2O_4$ and $Cl_2$ is returned as reflux through line 18 to the top of oxidizer 7. The temperature maintained in the top of column 15 is about 10° C. and at its base approximately 50–70° C. The liquid $N_2O_4$—$Cl_2$ is introduced through line 17 into the top of drying column 15 at a low temperature about −20° C. to assure effective removal of moisture and HNO₃ from the vapors introduced therein.

$N_2O_4$—$Cl_2$ dried vapor from the top of column 15 flows through line 19 into oxidation condenser 21 which is a heat exchanger wherein the vapor is condensed by a refrigerant, for example boiling $CCl_2F_2$. $N_2O_4$—$Cl_2$ condensate discharges through line 22 into weir box 23 from whence a portion flows through line 17 into drying column 15 as previously described and another portion is directed through line 24 into separation column 25 wherein $N_2O_4$ and $Cl_2$ are fractionated into substantially pure $Cl_2$ at the top and substantially pure $N_2O_4$ at the base. Separation column 25 may be a conventional bubble-cap column operating with the top temperature of about 0° C. and a base temperature of about 55° C. and a reflux ratio of approximately 1.5. Fractionation in column 25 is better effectuated at superatmospheric pressure, a pressure of 50–60 pounds may be readily maintained on column 25 by elevating oxidation condenser 21 sufficiently above column 25 so that the column of liquid in line 24 due to the differential in height will impress a superatmospheric pressure on column 25. Heat for effecting fractionation of the $N_2O_4$—$Cl_2$ mixture may be supplied by a steam coil 26 disposed in the base of tower 25. Substantially pure chlorine vapor released from the top of tower 25 through line 27 is cooled and condensed in separation column condenser 28 by indirect heat exchange with a refrigerant such as $CCl_2F_2$ and the condensate therefrom flows through line 29 into weir box 31 with a portion of the condensate returning through line 32 into the top of column 25 as reflux and the remainder of the chlorine discharging through line 33 as an end product of the system. Since the $N_2O_4$ discharging from the bottom of column 25 through line 34 will be used to produce nitric acid of about 80% concentration for recycle by reaction with water in the dilute nitric acid from HCl digester 2 it should desirably be substantially free of NOCl. Removal of NOCl may be effected by withdrawing through line 35 a small side stream containing NOCl from column 25 and returning the side stream through line 3 to HCl digester 2 wherein it is converted to additional chlorine and $N_2O_4$.

Referring again to HCl digester 2, the dilute nitric acid, about 50% concentration, from the base of digester 2 flows by gravity through line 5 to nitric acid tank 36 wherein the acid in the tank is cooled to about 50° C. by conventional means not shown in the drawing. Acid from tank 36 is forced by pump 37 through line 38 into nitric acid concentrator 39, a conventional bubble-cap column, maintained at subatmospheric pressure about 24–26 inches Hg vacuum. Connected to the bottom of column 39 by conduits 41 and 42 is the usual reboiler section 43 which supplies heat for vaporization of the water from the nitric acid. Water removed through line 44 from the top of concentrator 39 is condensed and vacuum obtained in a barometric conventional jet condenser designated generally by numeral 45. A small amount of water, preferably steam condensate, is introduced as reflux through line 46. As a result of the vacuum distillation in concentrator 39 the 50% acid is concentrated to about 60–65% nitric acid which is withdrawn from the bottom of the reboiler section 43 through line 47, cooled in nitric acid cooler 48 and then passed through line 49 into nitric acid surge tank 51.

Although theoretically there is no net consumption of nitric acid in the process since the $N_2O_4$ resulting from reaction of HNO₃ and HCl is converted in the system to nitric acid and recycled for further reaction, nevertheless, there is a small loss of nitric acid attendant the operation as is common in most chemical processes. A convenient place for adding make-up HNO₃ to maintain equilibrium conditions in the system is surge tank 51 into which make-up nitric acid is added through line 52. The 60% nitric acid in tank 52 is forced through line 53 by pump 54 into the top of $N_2O_4$ absorber 55, a conventional plate type absorber, wherein nitric acid flows downwardly countercurrent to an upward flow of a mixture of vaporized $N_2O_4$ and air entering the bottom of absorber 55 through line 56. The acid forming reaction may be expresesd by the following equation:

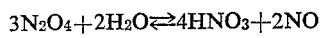

$$3N_2O_4 + 2H_2O \rightleftarrows 4HNO_3 + 2NO$$

The liberated NO will be partially oxidized in the column by oxidation in the air to regenerate $N_2O_4$ as follows:

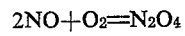

$$2NO + O_2 = N_2O_4$$

The chemical equilibrium in the first reaction is such that a very high ratio of $N_2O_4$:NO in the gas is necessary to produce nitric acid. The rate of oxidation of NO as shown by the second equation is very slow under the low pressure of NO which is required by the equilibrium. Therefore, an excess of $N_2O_4$ is maintained in the gas phase by recirculating $N_2O_4$ through column 55. The absorption system which includes $N_2O_4$ absorber 55 is operated under superatmospheric pressure of the order of 75 p. s. i. gauge to increase the oxidation rate and facilitate later recovery of the excess $N_2O_4$ by condensation and by scrubbing with refrigerated 80% nitric acid. The temperature in absorber 55 is maintained at about 60–70° C.

The gas released from the top of absorber 55 through line 57 is composed of a mixture of $N_2O_4$, NO, nitrogen and unreacted oxygen. This mixture of gases flows through $N_2O_4$ condenser 58 where it is cooled by indirect contact with water to about 35–40° C. to effect condensation of a large fraction of the $N_2O_4$ in the gases which condensate is returned through line 59 to $N_2O_4$ vaporizer 61. Most of the NO leaving absorber 55 will be oxidized to $N_2O_4$ in condenser 58.

The residual gas from condenser 58 enters the vent scrubber 62 through line 63 wherein it is scrubbed in the packed column with a countercurrent flow of refrigerated 80% $HNO_3$ at about $-5°$ C. entering through line 64, to remove th remaining $N_2O_4$ and to effect final oxidation of any NO present. The scrubbed gases consisting essentially of nitrogen and unreacted oxygen are vented through line 65 to the atmosphere. The nitric acid and absorbed $N_2O_4$ from the bottom of scrubber 62 at about 30–35° C. are returned through line 66 to $N_2O_4$ vaporizer 61.

Vaporizer 61 is a film type unit designed so that entering liquids will flow down as a film over the inside walls of externally steam heated vertical tubes in the vaporizer countercurrent to air which is introduced through line 67 at the bottom of vaporizer 61. The liquids entering vaporizer 61 are $N_2O_4$ withdrawn from the bottom of separation column 25 through line 34 and forced by pump 68 through line 69 into the top of vaporizer 61; nitric acid of about 80% concentration from the bottom of absorber 55 through lines 71 and 72; $N_2O_4$ from condenser 58 through lines 59, 73 and 72; and nitric acid containing dissolved $N_2O_4$ from the bottom of vent scrubber 62 through lines 66, 73 and 72. As the mixture of liquids composed primarily of nitric acid and $N_2O_4$ entering the top of vaporizer 61 flows downwardly through the steam heated tubes there is vaporized from the mixture $N_2O_4$, leaving liquid nitric acid of about 80% concentration. The air introduced through line 67 into the bottom of vaporizer 61 strips the downflowing acid of residual dissolved $N_2O_4$ which acid finally discharges from vaporizer 61 at a temperature of about 100–140° C. through line 74. Air and gaseous $N_2O_4$ are released from the top of vaporizer 61 through line 56 into the bottom of $N_2O_4$ absorber 55. Approximately 80% of this $N_2O_4$ is recycled. As previously mentioned, in order to produce nitric acid at a reasonable rate by reaction of $N_2O_4$ with $H_2O$ it is necessary to maintain a very high ratio of $N_2O_4$ to NO. This we accomplish by recycling at least 2½ parts of $N_2O_4$ for every part of $N_2O_4$ introduced into absorber 55 as makeup.

Nitric acid of about 80% concentration withdrawn from the bottom of vaporizer 61 through line 74 is cooled with water in cooler 75 and the cooled nitric acid directed through line 76 to surge tank 77. A portion of the nitric acid in tank 77 is returned by pump 78 through line 79, refrigerator 81 wherein the nitric acid is cooled to a temperature of about $-5°$ C. and thence the refrigerated nitric acid sprayed into the top of vent scrubber 62 through line 64. Another portion of the nitric acid from tank 77 is withdrawn through line 82 and forced by pump 83 through line 9 into $HNO_3$ vaporizer 11 and thence through line 8 into NOCl oxidizer 7.

From the foregoing description it will be apparent that our process acomplishes conversion of HCl into substantially pure chlorine in a closed cycle with the consumption of only a minor amount of nitric acid and without the productiton of any by-products.

A specific example for practicing the process in accordance with the present invention is as follows. Hereinafter, unless otherwise stated, all quantities will be expressed in terms of rate of net tons per 24 hours.

Hydrochloric acid (90% HCl—10% water) at the rate of 25.75 tons HCl is introduced into an HCl digester maintained under 3 p. s. i. gauge pressure with a top temperature of 100° C. and a base temperature of 120° C. As a result of reaction with 67.7% by weight nitric acid (51.5 tons $HNO_3$—24.5 tons $H_2O$) there is evolved from the HCl digester 16.7 tons $Cl_2$ and 15.25 tons NOCl which is introduced into an NOCl oxidizer. 67.7% nitric acid utilized in the HCl digester is a product from NOCl oxidation. A 52.5% nitric acid (36.5 tons $HNO_3$—33 tons $H_2O$) is withdrawn as a separate stream from the HCl digester and directed to the $HNO_3$ concentrator for removal of moisture.

In the NOCl oxidizer the $Cl_2$ and NOCl from the HCl digester are reacted with 80% nitric acid (80.75 tons $HNO_3$—20.25 tons $H_2O$) to produce 25 tons $Cl_2$ and 32.5 tons $N_2O_4$. This mixture of $Cl_2$ and $N_2O_4$ is separated by fractional distillation into about 25 tons $Cl_2$ which is discharged from the system as the product of the process and about 32.5 tons of $N_2O_4$ (equivalent to 44.25 tons $HNO_3$) which is directed to a $N_2O_4$ absorption system for production of 80% $NHO_3$ by contact with dilute nitric acid.

The dilute nitric acid just referred to is obtained by evaporating in a vacuum still 7 tons of moisture from the 52.5% nitric acid obtained from the HCl digester to produce thereby 62.5 tons of 58.5% $HNO_3$ (36.5 tons $HNO_3$—26.0 tons $H_2O$). By contacting the 58.5% $HNO_3$ with the $N_2O_4$ in the presence of air in the $N_2O_4$ absorption system there is produced 101 tons of 80% nitric acid which is returned for oxidation of the NOCl in the NOCl oxidizer thereby completing the cycle. Of course, a small amount of make-up $HNO_3$ is added to the system to compensate for the usual losses in such operation.

Although certain preferred embodiments of the invention have been disclosed for purpose of illustration, it will be evident that various changes and modifications may be made therein without departing from the scope and spirit of the invention.

We claim:

A method of reacting $N_2O_4$ with dilute nitric acid to produce therefrom nitric acid having a concentration of at least 75% by weight $HNO_3$ which comprises passing $N_2O_4$ together with nitric acid cocurrently downwardly through a separate and distinct heated chamber countercurrent to an upward stream of air, withdrawing concentrated nitric acid of at least 75% by weight $HNO_3$ from the bottom of the chamber, passing the mixture of air and $N_2O_4$ released from the top of the chamber, upwardly through a separate and distinct absorber countercurrent to a downward flow of dilute nitric acid, passing concentrated nitric acid from the bottom of the absorber to the top of the chamber for cocurrent downward flow with $N_2O_4$ countercurrent to the rising stream of air therein, cooling the uncondensed gases from the absorber comprising a mixture of nitrogen, $N_2O_4$ and unreacted oxygen in a separate and distinct condenser to effect condensation of the $N_2O_4$ in the ratio of at least 2½ parts condensate for every part of nitrogen dioxide from an external source, returning the condensed $N_2O_4$ to the heated chamber for cocurrent flow with nitric acid downwardly countercurrent to the stream of air, scrubbing residual gases comprising primarily nitrogen, unreacted oxygen and a minor amount of $N_2O_4$ with cold concentrated nitric acid withdrawn from the bottom of the chamber in a separate and distinct scrubber thereby removing $N_2O_4$ from the residual gases, passing the concentrated nitric acid after scrubbing of the residual gases to the heated chamber for cocurrent downward flow with $N_2O_4$ countercurrent to the stream of air, and discharging the scrubbed gases substantially free from $N_2O_4$ from the system.

References Cited in the file of this patent
UNITED STATES PATENTS

| | | |
|---|---|---|
| 2,028,402 | Luscher | Jan. 21, 1936 |
| 2,046,162 | Handforth et al. | June 30, 1936 |
| 2,088,057 | Handforth | July 27, 1937 |
| 2,185,580 | Beekhuis | Jan. 2, 1940 |
| 2,665,195 | Congdon et al. | Jan. 5, 1954 |